(12) United States Patent
Kinoshita

(10) Patent No.: US 6,247,760 B1
(45) Date of Patent: Jun. 19, 2001

(54) WHEEL COVER

(75) Inventor: Yuji Kinoshita, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 09/336,754

(22) Filed: Jun. 21, 1999

(30) Foreign Application Priority Data

Jun. 23, 1998 (JP) .................................................. 10-175831

(51) Int. Cl.$^7$ ....................................................... B60B 7/10
(52) U.S. Cl. ..................................... 301/37.34; 301/37.41
(58) Field of Search ................................ 301/37.1, 37.31, 301/37.34, 37.41, 37.42, 37.35, 37.36

(56) References Cited

U.S. PATENT DOCUMENTS

| | | | |
|---|---|---|---|
| 1,329,935 | * 2/1920 | Smith ............................ | 301/37.41 X |
| 3,051,276 | * 8/1962 | Lyon ............................. | 301/37.41 X |
| 4,027,919 | * 6/1977 | Foster et al. ..................... | 301/37.35 |
| 5,083,841 | * 1/1992 | Fleming ........................... | 301/37.35 |
| 5,141,291 | * 8/1992 | Roulinson ........................ | 301/37.34 |
| 5,803,552 | * 9/1998 | Kato et al. ....................... | 301/37.41 |

FOREIGN PATENT DOCUMENTS

| | | | |
|---|---|---|---|
| 2451071 | * 4/1976 | (DE) | .................................. 301/37.36 |
| 2481197 | * 10/1981 | (FR) | .................................. 301/37.34 |
| A9-193601 | 7/1997 | (JP) . | |

* cited by examiner

Primary Examiner—Russell D. Stormer
(74) Attorney, Agent, or Firm—Birch, Stewart, Kolasch & Birch, LLP

(57) ABSTRACT

An automobile wheel cover has a cover body and a plurality of elastically deformable hooks projected from a backside of the cover body. Each hook has a hook portion engaging with a spoke of a wheel. The hook portion of each hook has a first slide surface made of plastic and a second slide surface made of metal. The first slide surface is slidable on a wheel surface at time of attaching the cover body to the wheel, and the second slide surface is slidable on a holding edge of a backside of the wheel at time of detaching the cover body from the wheel. Each hook includes a plastic body having the first slide surface and a metal piece, which is connected to the plastic body to provide the second slide surface. The metal pieces of two adjacent hooks are integrally connected with each other by a metal plate. When attaching and detaching the cover body to and from the wheel, each hook is deformed from an original position. The connection of the metal pieces to the metal plate provides a restoring force biasing the hooks back to the original position.

3 Claims, 8 Drawing Sheets

Fig./ PRIOR ART

WHEEL COVER

BACKGROUND OF THE INVENTION

1. Field of the Invention

The present invention relates to a wheel cover which is attached to an automobile wheel for ornamentation, and particularly relates to an attaching mechanism of the wheel cover to the automobile wheel.

2. Description of the Related Art

In order to improve the ornamentation of the automobile wheel, an aluminum wheel is generally utilized. However, since the ordinary aluminum wheel can not change its ornamental surface, a user can not enjoy a variety of designs with the aluminum wheel. Applicant of this application completed an invention for resolving the conventional problem, and filed its patent application (Japanese Laid Open Patent Publication No. 9-193601).

FIG. 1 shows one embodiment in the above patent application. An aluminum wheel for automobile is comprised of a wheel body 10 made of aluminum and a cover 20 which is detachably fixed to the wheel body 10. The wheel body 10 is intended for providing necessary and minimum strength to the wheel. In the above application, as examples of the attaching manner of the cover 20 to the wheel body 10, utilizing a variety of clips or a planar fastener is disclosed. Other than those disclosed in the application, holding hooks 22 as shown in FIG. 2 can also be utilized.

FIG. 2 shows a cross section along the line 2—2 in FIG. 1 wherein the cover 20 is attached to the wheel body 10. From a backside of a spoke 21 of the cover 20, a pair of holding hooks 22 are projected in face to face relationship. Each hook portion 22a at the free end of the holding hook engages with a backside of the spoke 11 of the wheel body 10, so that the cover 20 can be fixed to the wheel body 10. With this construction, however, when the cover 20 as an ornament is detached from the wheel body 10 in order to be replaced with another one, the backside edge (holding edge) 11a of the spoke 11 made of aluminum bites into the root of the hook portion 22a of the holding hook 22, and in an extreme case, the hook portion 22a is broken to spoil the holding hook 22.

SUMMARY OF THE INVENTION

It is therefore an object of the present invention to provide a wheel cover which is to be fixed to a wheel by making use of a holding hook, wherein the wheel cover can be easily and surely fixed to the wheel, and wherein possibility of the breakage of the holding hook is lowered upon detaching the wheel cover from the wheel.

In accomplishing this and other objects of the present invention, there is provided a wheel cover comprising:

a cover body; and a plurality elastically deformable holding hooks which are projected from a backside of the cover body, each holding hook having a hook portion engaging with a wheel, the hook portion having a first slide surface made of plastic and a second slide surface made of metal, and the first slide surface being slidable on a surface of the wheel at time of attaching the wheel cover to the wheel, and the second slide surface being slidable on a holding edge of a backside of the wheel at time of detaching the wheel cover from the wheel.

In the wheel cover of the present invention constructed as above, when attaching the wheel cover to a wheel, the first slide surface, which is made of plastic and relatively softer than wheels made of steel or aluminum, of the holding hook is to slide on the wheel surface, so that wheel never be injured. Further, when detaching the wheel cover from the wheel, what slides on a holding edge of a backside of the wheel is the second slide surface made of metal rather than plastic, so that the holding hook can be protected from the acute holding edge of the backside of the wheel. Thus, it can be effectively prevented that the holding edge breaks the holding hook.

The wheel cover of the present invention can be attached to both of a steel wheel and an aluminum wheel. In the case that the wheel cover is attached to a wheel having a plurality of spokes extending radially (in many cases, such wheel is made of aluminum), it is preferable that, for each one of predetermined number of spokes selected from the spokes, a pair of holding hooks facing toward each other in circumferential direction is provided, and that the cover is attached to such wheel by engaging hook portions of the pair of holding hooks with each spoke, laterally. In this case, it is advantageous that each of the holding hooks is comprised of a plastic body having the first slide surface, and a metal piece which is connected to the plastic body and which has the second slide surface, and that two metal pieces of adjacent two holding hooks are integrally connected with each other into one single piece, and each holding hook deformed is biased into an original position by an elasticity of the one single piece.

With such construction, attachment stability during the wheel cover is attached to the wheel can be obtained from the connected construction of the one metal piece. Generally, in order to increase the attachment stability of a wheel cover, it is necessary that the recovering force into an original position of the elastically deformed holding hook must be increased, and therefore, the wheel cover body must be thicker. However, as above mentioned, two metal pieces are connected with each other into one integral piece, and with this one metal piece the holding hooks are biased into original position, whereby the recovering force of the holding hook can be increased without making the wheel cover body thicker. Thus, great advantage is brought by the present invention, in view of right weight and thinness of the wheel cover, and the degree of design freedom. Further, in case that a wheel cover is fixed to a wheel only with elastic recovering force of the plastic body of the holding hook, there is possibility that the attachment stability is lowered under a thermal deformation of the plastic body. On the other hand, such possibility can be lowered by obtaining the attachment stability with the one metal piece.

In that case, it is preferable that there are connected two metal pieces of a pair of the holding hooks which are associated with a same one spoke. However, there also can be connected two metal pieces of holding hooks which belong to different pairs associated with different spokes.

BRIEF DESCRIPTION OF THE DRAWINGS

This and other objects and features of the present invention will become clear from the following description taken in conjunction with the preferred embodiment thereof with reference to the accompanying drawings, in which.

DETAILED DESCRIPTION OF THE PREFERRED EMBODIMENTS

Figure 3:
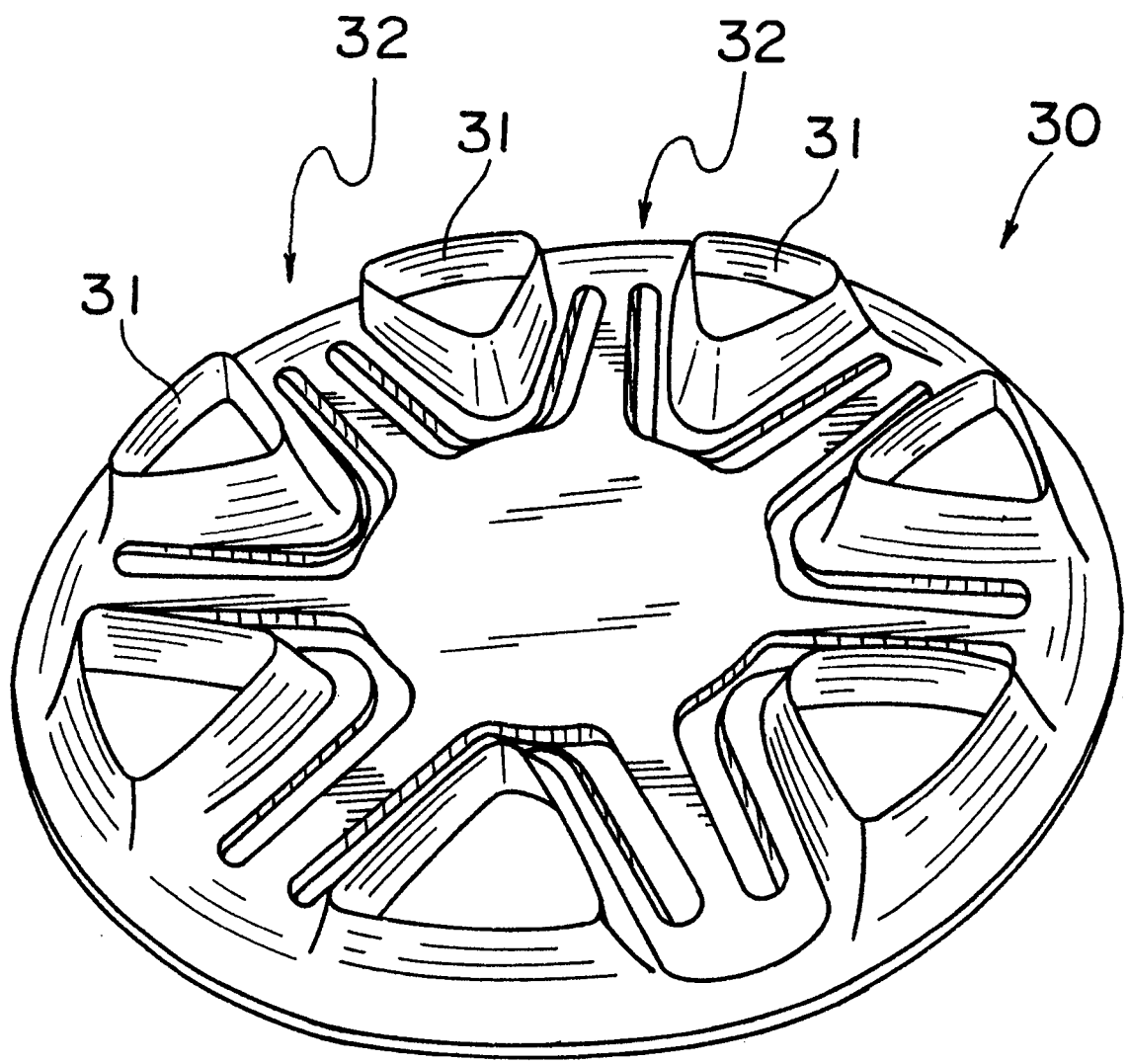
FIG. 3 is a schematic perspective view of a backside of a wheel cover of one embodiment of the present invention.

FIG. 3 is a perspective view showing a backside of a wheel cover 30 of one embodiment of the present invention. Seven triangular tubular walls 31 extend from the backside of the wheel cover 30, and they are arranged in the circumferential direction with a predetermined interval between adjacent walls 31. Each opening formed inside each wall 31 is intended for ornament on a front side of the wheel cover 30.

Figure 1:
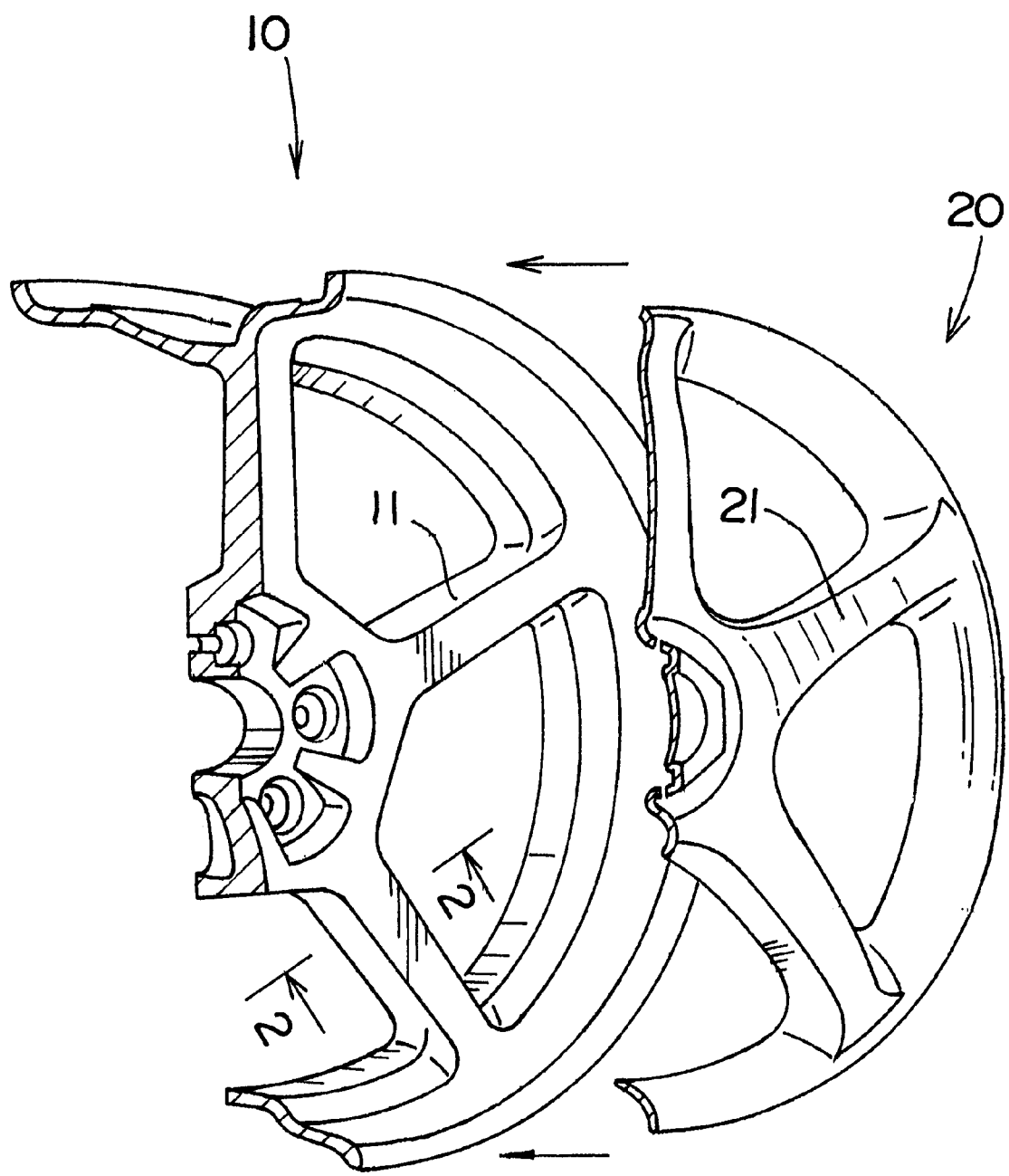
FIG. 1 is a partial perspective view of a conventional aluminum wheel comprised of a wheel body and a cover.

As shown in FIG. 3, seven valleys (valley-shaped spaces) 32 in total extend radially, each of which is formed between the adjacent two walls 31. Namely, this wheel cover 30 is intended to attach itself to a spoked wheel body as shown in FIG. 1, and each spoke of the wheel body is positioned in a valley 32. On both sides of each valley, respectively, there is arranged one holding hook 60 which has a hook portion 61 (refer to FIG. 6) engaging with the wheel body at the spoke. In other words, one pair of the holding hooks are arranged for one spoke positioned in the valley 32.

Figure 4:
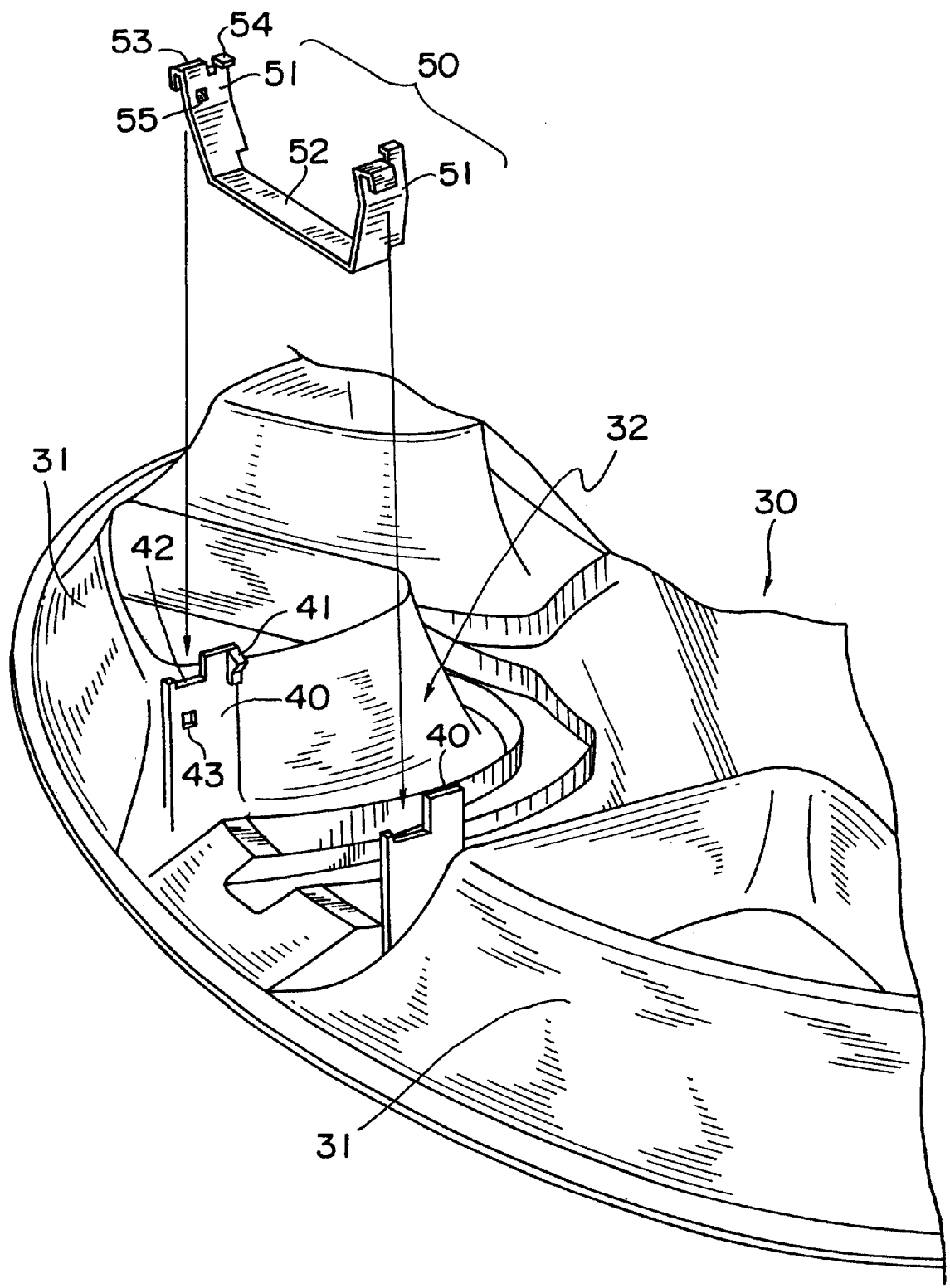
FIG. 4 is a partial perspective view showing a holding hook of the wheel cover of FIG. 3.

The holding hooks are not shown in FIG. 3, but in an enlarged view of FIG. 4, they are shown. Although seven valleys are formed in FIG. 3, there is no necessity to provide a holding hook pair in all seven valleys. It may suffice instead to provide a holding hook pair in suitable selected valleys 32 (preferably, three valleys or more). Further, the number of the valleys 32 (namely, the number of the spokes) is not limited to seven.

The pair of holding hooks arranged on both sides of the valley 32 is described below. Each holding hook, or retaining member is comprised of a plastic body 40 and a metal piece 51 which is attached to the plastic body 40. FIG. 4 shows a particular embodiment wherein each metal pieces 51 of two holding hooks are connected with each other by an elongated plate 52. In other words, two metal pieces 51 are integrally formed into one metal holder 50. But, as explained later, a separate metal piece can be employed for each holding hook.

The two plastic bodies 40 shown in FIG. 4 are arranged face to face in the circumferential direction of the wheel cover, and they are shaped in a mirror image relationship to each other. The two metal pieces 51 connected by the plate 52 are also shaped in mirror image relationship to each other, so that two holding hooks 60, each of which is comprised of the plastic body 40 and the metal piece 51, are also in mirror image relationship (refer to FIG. 6).

The plastic body 40 is a flat plate member, or post element projecting from the backside of the wheel cover 30 nearly in normal direction or in general alignment with the turning axis of the wheel. At a projecting free end of the plastic body 40, a notch 42 is formed. Further, at an inner position in radial direction of the wheel cover 30 relative to the notch 42, there is arranged a projecting triangular plastic hook 41. In FIG. 4, closely below the notch 42, a rectangular recess 43 is formed. As explained later, in this recess 43, a protrusion 55 of the metal piece 51 is engaged. The protrusion 55 is formed by partially cutting out the metal piece 51 and bending the cut out portion.

The metal piece 51 is also a generally flat plate member, and has a return end 53 which is engaged with the notch 42 of the plastic body 40. At an inner position in radial direction of the cover 30 relative to the return end 53, there is arranged a metal hook 54 which is upwardly bent with a gentle angle.

Figure 5:
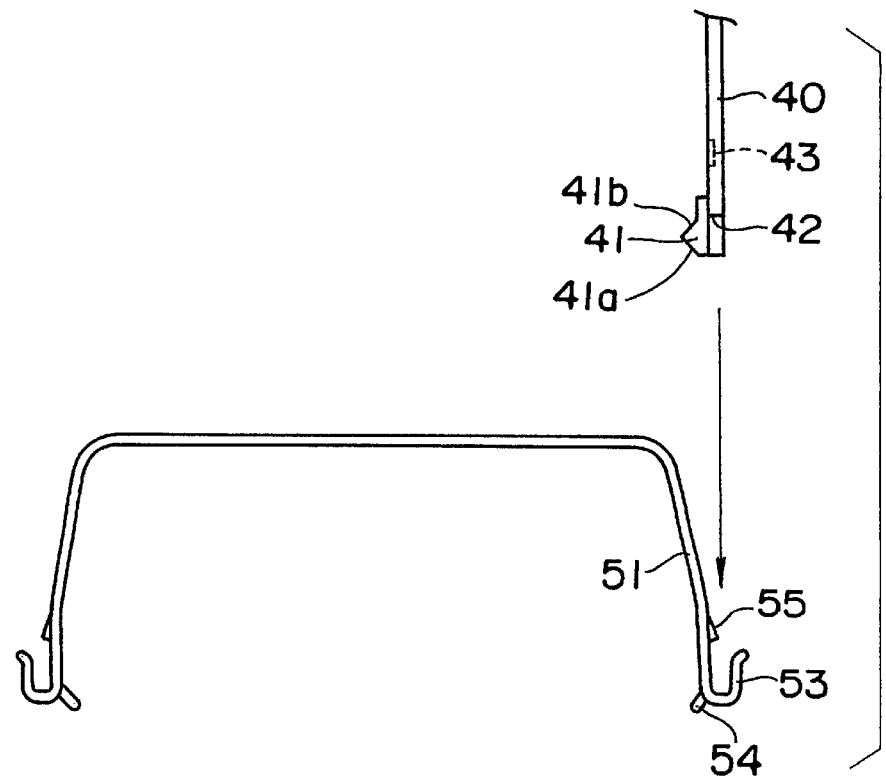
FIGS. 5 and 6 are respectively schematic explanatory views showing a manner to connect a plastic body and a metal piece, both shown in FIG. 4.
Figure 6:
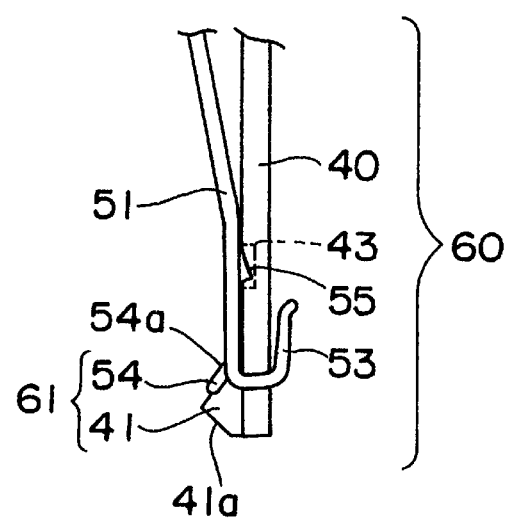

As shown by arrows in FIG. 4, when one metal holder 50 is combined with two adjacent plastic bodies 40, each plastic body 40 is connected to each metal piece 51 of the holder 50, so that each holding hook 60 is completed. One holding hook 60 is diagrammatically shown in FIGS. 5 and 6. As to the other holding hook, its constitution is of course the same. In FIGS. 5 and 6, an upper side on paper corresponds to the front side of the wheel cover 30.

Figure 7:
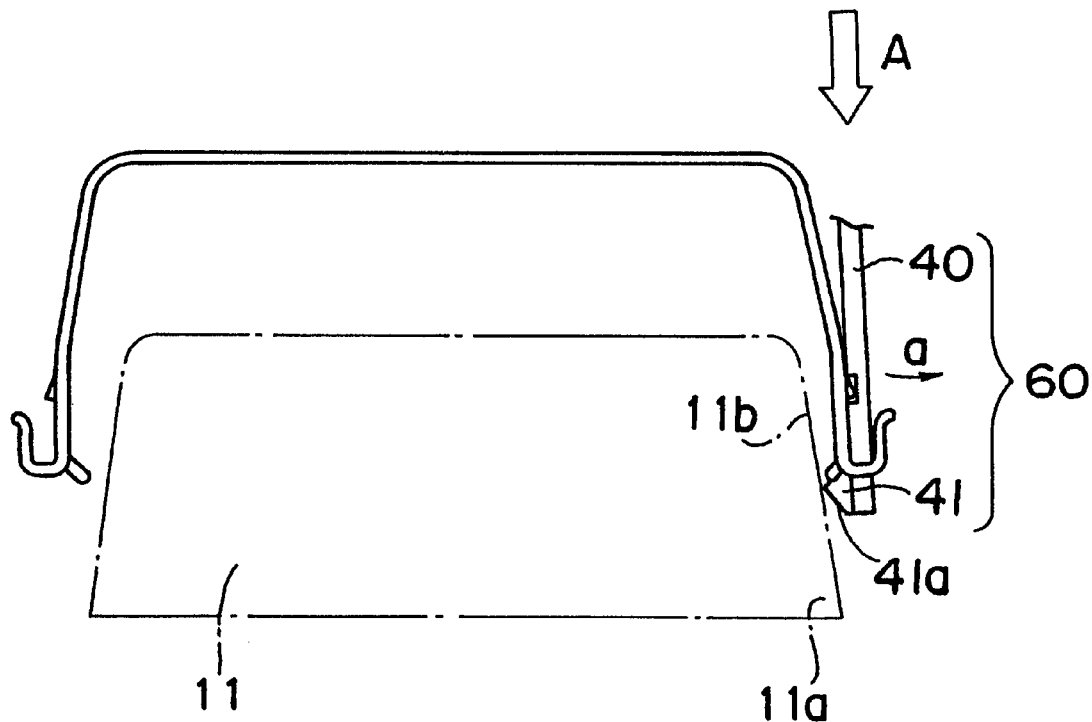
FIGS. 7 and 8 are respectively schematic explanatory views showing how the holding hook of the wheel cover of FIG. 3 functions.
Figure 8:
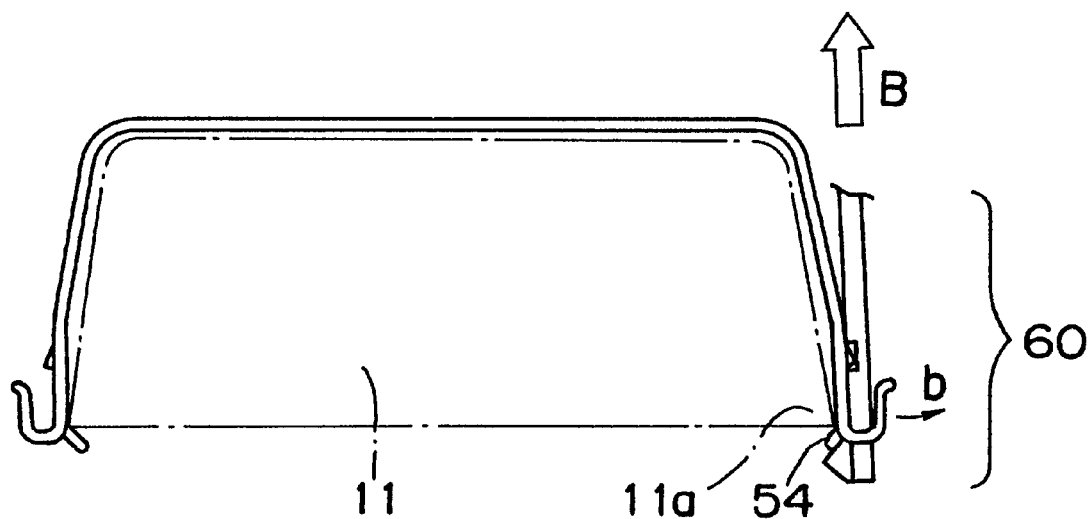

FIG. 5 shows a state before the plastic body 40 and the metal piece 51 are connected to each other, and FIG. 6 shows a state after they are connected to each other. The triangular plastic hook 41 has two slopes, namely, a slope 41a on a lower side in FIG. 5 and a slope 41b on an upper side in FIG. 5. As shown in FIG. 6, when the plastic body 40 and the metal piece 51 are combined to each other, the metal hook 54 of the metal piece 51 is positioned along with one upper slope 41b of the triangular plastic hook 41. In this embodiment, the hook portion 61 of the holding hook 60 is comprised of the plastic hook 41 and the metal hook 54 having a plastic surface 41a facing obliquely away from the wheel cover and a metal surface 54a facing obliquely toward the wheel cover. As shown in FIGS. 6, 7 and 8, the plastic surface projects transversely farther from the post elements 40 and 51 than does the metal surface. It can be understood that the protrusion 55 formed on the metal piece 51 is engaged in the recess 43 of the plastic body 40 so that their connection is ensured.

Figure 2:
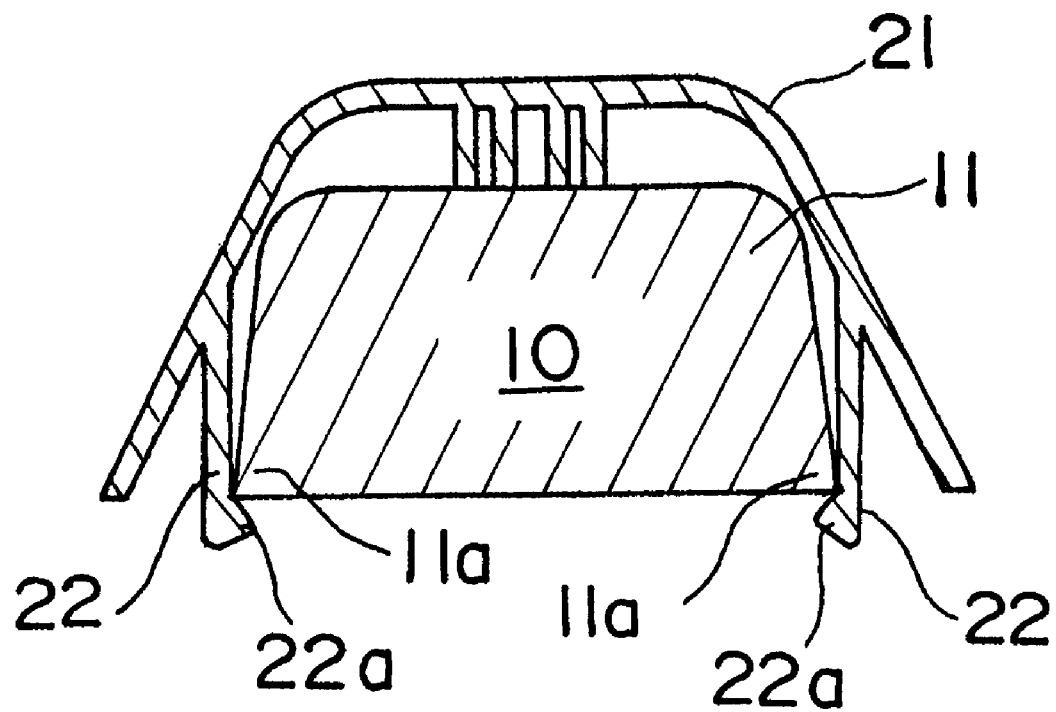
FIG. 2 is an explanatory view showing one example of how to attach the cover to the wheel body in FIG. 1.

The function of the hook portion 61 of the holding hook 60 is explained with reference to FIGS. 7 and 8. FIGS. 7 and 8 are cross sectional views corresponding to FIG. 2. FIG. 7 shows a function of the hook portion 61 against the spoke 11 of the wheel body when attaching the wheel cover to the wheel body, and FIG. 8 shows a function of the hook portion 61 against the spoke 11 of the wheel body when detaching the wheel cover from the wheel body. In FIGS. 7 and 8, although only one holding hook existing on right side of the spoke 11 is shown, a same holding hook exists also on left side of the spoke 11.

As shown in FIG. 7, when the holding hook 60 moves downwardly relatively to the spoke 11 (arrow "A") at time of attaching them together, one slope 41a comes into contact with the spoke surface (mainly, side surface) so that the entire holding hook 60 is elastically deformed sideways (arrow "a"). That is, one slope 41a of the plastic hook 41 is a "first slide surface" made of plastic which slides on the wheel surface when attaching the wheel cover to the wheel. After the "first slide surface" 41a passes an edge 11a at the backside of the spoke 11, the elastically deformed holding hook 60 returns to its original position by virtue of the urging force (elasticity) of the metal holder 50, so that the state of FIG. 8 is realized. Thus, the attachment of the wheel cover to the wheel is completed.

FIG. 8 shows a connected state of the holding hook 60 and spoke 11 after the completion of the attachment, and it is understood that, with the backside edge 11a, the metal hook 54, and not the plastic hook 41, is engaged. From this condition, when detaching the wheel cover therefrom, a force is exerted upon the holding hook 60 in a direction of an arrow "b" in FIG. 8. It can be understood that, at this time, until the hook portion 61 disengages from the edge 11a, the metal hook 54 slides on the edge 11a. That is, a surface 54a (FIG. 6) of the metal hook 54 is a "second slide surface" made of metal which slides on the holding edge at the backside of the wheel when detaching the wheel cover from the wheel. The "second slide surface" 54a is made of metal, and therefore, can protect the plastic hook 41 from the edge 11a. After the "second slide surface" 54a passes the edge 11a, the elastically deformed holding hook 60 in the direction "b" returns to its original position by virtue of the urging force (elasticity) of the metal holder 50.

As will be understood from the above explanation with reference to FIGS. 7 and 8, when attaching the wheel cover to the wheel body, since the plastic hook 41 of the holding hook 60 slides on the aluminum surface of the spoke 11, the spoke 11 is never injured. On the other hand, when detaching the wheel cover from the wheel body, the acute edge 11a slides on the surface of the metal hook 54. That is, the metal hook 54 protects the hook portion 61 of the holding hook 60. Thanks to this construction, there can be avoided a possibility that the edge 11a breaks the hook portion 61.

In the above-mentioned embodiment, the holding hook 60 is comprised of the plastic body 40 and the metal piece 51. But, in view of protecting the wheel body and the holding hook of the wheel cover so as not to be injured respectively at time of both attaching and detaching of the wheel cover, all that is needed for each holding hook is that at least the slide surface 41a (first slide surface) is made of plastic and at least the slide surface 54a (second slide surface) is made of metal. And also, the configurations of the plastic body 40 and metal piece 51 are not limited to particular ones shown in the drawings. Further, the facing pair of the metal pieces 51 need not be connected to each other. But, in the case that they are connected to each other, an advantage described below will be realized.

In order to increase a strength with which the wheel cover is connected to the wheel, it is necessary to increase the recovering force of the elastically deformed holding hook which urges the holding hook itself into the original position. However, if the wheel cover body is made thicker to increase the recovering force, it will be impossible to make the body in right weight and thin, and the degree of design freedom is decreased. In the case that two metal pieces are integrally connected as in the shown embodiment so as to urge two metal pieces into the original position, it becomes possible to increase elastic recovering force of the holding hook without making the wheel cover body thicker. Besides, in case that the wheel cover is fixed to the wheel body by virtue of elasticity of plastic body 40, since the plastic body 40 is easily heat deformed, if the heat deformation occurs, the attachment stability will be decreased. On the other hand, if the attachment stability is obtained by employing the metal holder 50, such a possibility can be lowered.

Figure 9:
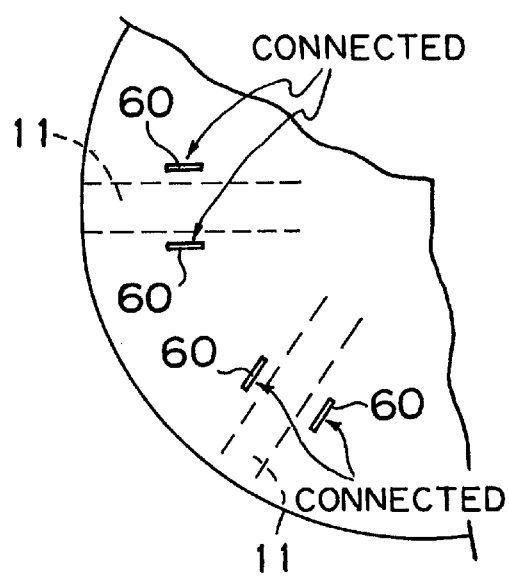
FIGS. 9 and 10 are respectively schematic explanatory views to show a connective relationship between metal pieces of adjacent holding hooks of the wheel cover of the present invention.
Figure 10:
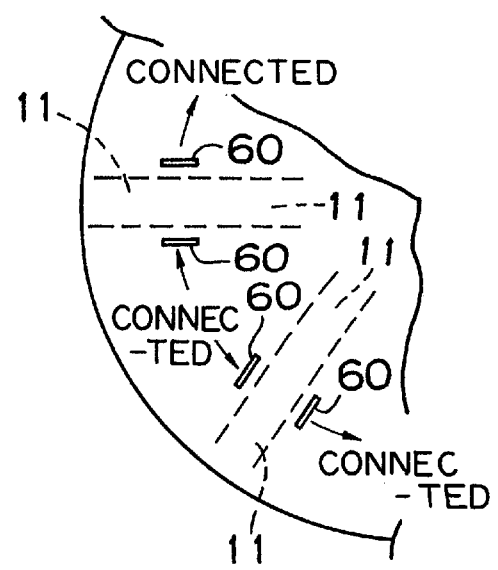

As shown in FIGS. 9 and 10, among embodiments wherein two metal pieces of the adjacent holding hooks are connected to each other, there are some kinds of aspects. In FIG. 9, the metal pieces of two holding hooks 60, both of which are associated with the same one spoke 11, are connected to each other. In FIG. 10, the metal pieces of two holding hooks, one of which is associated with one spoke 11 and the other of which is associated with another spoke 11, are connected to each other. Of course, in the case of FIG. 10, the configurations of the backside of the wheel cover 30 and the metal holder 50 (FIG. 4) will be slightly changed accordingly thereto.

Figure 11:
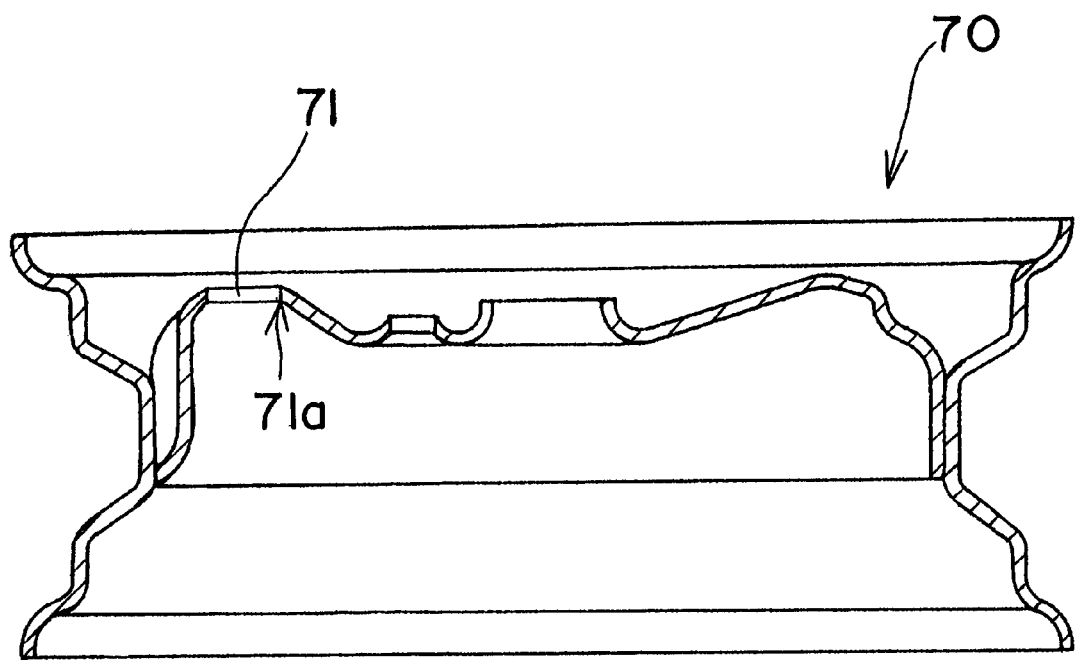
FIG. 11 is a schematic cross section of a steel wheel.

Further, in the case that an individual metal piece (a separate metal piece) is employed for each holding hook in which the metal pieces are not connected to each other, the hook portion of the holding hook needs not project in circumferential direction of the wheel cover. For example, in the case that the wheel cover of the present invention is attached to the ordinary steel wheel 70 of which the cross section is schematically shown in FIG. 11, the wheel cover is to be attached to the steel wheel 70 via a plurality of openings 71 which are arranged in the circumferential direction of the steel wheel 70. That is, since the hook portion of the holding hook can sufficiently achieve its function insofar as it can engage with any point or part of the circumferential edge 71a of the opening 71, the projecting direction of the hook portion can be freely selected.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wheel cover adapted to be detachably connected to a wheel having a side surface and having a backside surface with a holding edge, the wheel cover comprising:

a cover body; and a plurality of elastically deformable holding hooks which are projected from a backside of the cover body, in which each of the holding hooks has a hook adapted for engagement with the holding edge of the backside surface of the wheel, the hook portion having a first slide surface made of plastic and a second slide surface made of metal, and the first slide surface being sidable on side surface of the wheel at the time of attaching the wheel cover to the wheel, and the second slide surface being slidable on the holding edge of the backside surface of the wheel at the time of detaching the wheel cover from the wheel.

2. The wheel cover of claim 1 wherein the wheel has a plurality of spokes extending radially, the spokes having the backside surface with the holding edge, wherein the wheel cover has at least one pair of the holding hooks facing each other in a circumferential direction of the cover, the at least one pair of the holding hooks being engageable with at least one of the spokes, wherein each of the holding hooks comprises a plastic body having the first slide surface, and further comprises a metal piece which is connected to the plastic body and which has the second slide surface, wherein the metal pieces of two adjacent holding hooks are integrally connected with each other to form a single piece, and wherein the single piece has an elasticity whereby (1) the hook portions of the two adjacent holding hooks can deform during attachment and detachment of the wheel cover, and (2) the first slide surface is biased against the frontside surface of the wheel and the second slide surface is biased against the holding edge of the backside surface.

3. The wheel cover of claim 2 wherein the metal pieces of the two adjacent holding hooks, associated with the same spoke, are connected to each other.

* * * * *